Dec. 2, 1924.
V. G. REILLY
1,518,111
OPTICAL APPARATUS FOR USE IN THE HAND REPRODUCTION OF DRAWINGS,
PHOTOGRAPHS, AND OTHER ILLUSTRATIONS OR DESIGNS
Filed Jan. 3, 1923
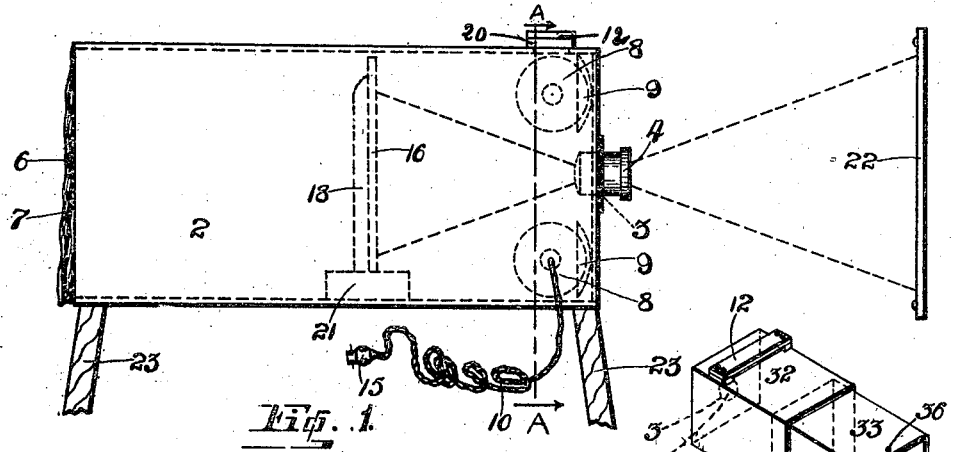
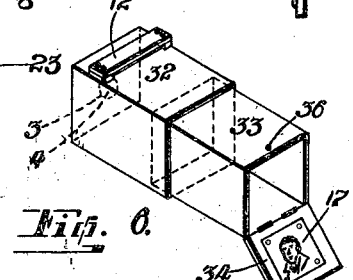
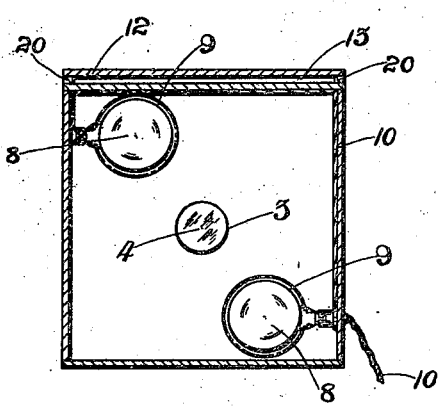
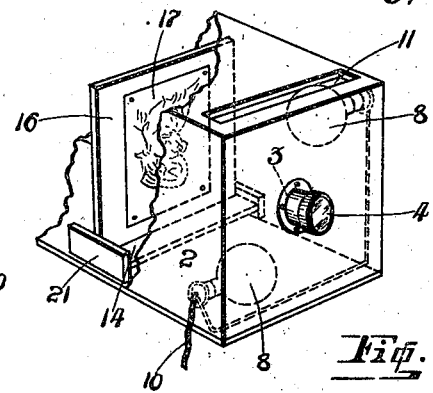
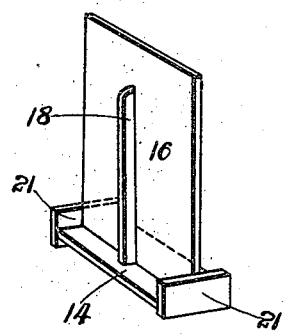
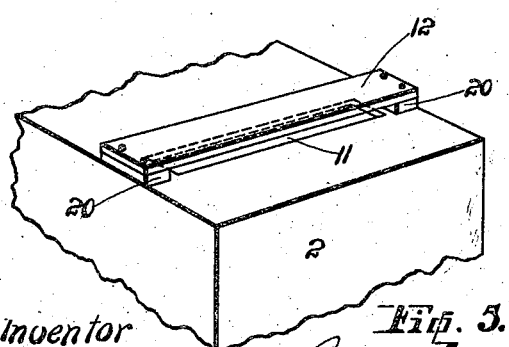
Inventor
V. G. Reilly
by
Attorney Patented Dec. 2, 1924.

1,518,112

UNITED STATES PATENT OFFICE.

WILLIAM GEORGE RUSCOE, OF STAMFORD, CONNECTICUT.

HEADLIGHT GLARE SHIELD.

Application filed April 1, 1924. Serial No. 703,470.

*To all whom it may concern:*
Be it known that I, WILLIAM G. RUSCOE, glare shield in active position for intercepting and deflecting the light rays.

latter in relation to the easel so that the original picture or object on the latter may be disposed at different distances from the lens.

In use the illustration 17 to be reproduced is pinned upon the upstanding board 16 of the easel in an inverted position as in Figure 3 or if some article is to be drawn it may be rested upon the base 14 of the easel as aforesaid. The easel is then inserted through the open rear end of the box and the hanging curtain 7 closes said end thus excluding external light from the box. By lighting the lamps 8 within the box and darkening the room or apartment in which the apparatus is located, the image of the illustration or article within the box is projected on to a sheet of drawing paper or other suitable surface 22 which may be pinned to a wall or other convenient object so that the image thrown onto the paper or like surface may be copied by following the lines of the projected image with a pen or pencil. To reduce the size of the image it is merely necessary to move the easel towards the rear of the box to move the latter forwardly in relation to the easel, or both these actions may be taken, to lengthen the distance between the original picture or article and the lens. To enlarge the projected image the reverse action is taken so that the original is brought nearer to the lens. By extinguishing the lamps in the box and relighting the room or apartment the progress of the work may be ascertained from time to time.

According to the modified construction shown in Fig. 6, which is preferred in practice, the box or casing is formed in two separate sections 32 and 33 adapted to telescope one within the other. The rear telescope section 33 is provided at its rear end with a detachable or hinged door or closure 34 preferably hinged at its bottom to act as a drop door and held in closed position by suitable fastening devices 36. Thus by pinning the figure or illustration to be copied on said door or placing the article to be drawn within the box section 33, the image thereof may be focussed on the screen or paper by relative sliding movement of the box sections. The separate stand or easel may thus be dispensed with.

By the invention copies of drawings, photographs and other pictures or illustrations as well as drawings from actual objects or articles may be readily executed in any desired size by comparatively unskilled persons, the invention having a wide range of utility and involving only a simple and inexpensive apparatus.

It is to be understood that various minor alterations or modifications may be introduced into the particular construction above described without departing from the spirit and scope of the invention.

Having now described my invention what I claim as new and desire to secure by Letters Patent is:—

Apparatus for the purpose indicated comprising in the combination of an elongated rectangular box or casing open at its rear end, a curtain covering said open end, a projecting lens positioned in the front end of said box, a stand or easel slidably mounted within said box and comprising an upstanding board adapted to hold an illustration or picture to be reproduced, and a ledge or base projecting forwardly from the lower end of said board to support an article or object for reproduction, an electric lamp or lamps located within said box between the projecting lens and the sliding stand or easel and reflectors attached to the front end of said box to reflect the light from the lamps on to the front of said easel substantially as described.

In testimony whereof I affix my signature.

VIRGIL GAVAN REILLY.

Witness:
J. O. GARY.